United States Patent [19]

Teshima et al.

[11] Patent Number: 5,612,452

[45] Date of Patent: Mar. 18, 1997

[54] PROCESS FOR PURIFICATION OF STYRENIC POLYMER

[75] Inventors: Hideo Teshima, Kanno Sodegaura; Komei Yamasaki, Kamiizumi Sodegaura, both of Japan

[73] Assignee: Idemitsu Kosan Co., Ltd., Tokyo, Japan

[21] Appl. No.: 582,806

[22] Filed: Jan. 4, 1996

Related U.S. Application Data

[63] Continuation of Ser. No. 290,786, Sep. 6, 1994, abandoned.

[30] Foreign Application Priority Data

Jan. 11, 1993 [JP] Japan ................................. 5-002221
Sep. 3, 1993 [JP] Japan ................................. 5-219984
Sep. 28, 1993 [JP] Japan ................................. 5-240826

[51] Int. Cl.$^6$ ........................................................ C08F 6/24
[52] U.S. Cl. ........................................... 528/492; 528/495
[58] Field of Search ................................... 528/492, 495

[56] References Cited

U.S. PATENT DOCUMENTS 5,247,020  9/1993  Nakano et al. ........................ 525/249
5,321,122  6/1994  Kuramoto et al. .................... 528/488

Primary Examiner—Thomas R. Weber
Attorney, Agent, or Firm—Oblon, Spivak, McClelland, Maier & Neustadt, P.C.

[57] ABSTRACT

The present invention relates to a process for efficiently purifying a styrenic polymer which comprises adding a poor solvent alone or in combination with a swelling agent to a syndiotactic polystyrene produced by the use of a catalyst comprising (A) an aluminoxane or a coordination complex compound comprising a cation and an anion in which a plurality of radicals are bonded to a metal and (B) a transition metal compound, and treating the polystyrene under a controlled water content of 15 to 10,000 ppm to simultaneously carry out deactivation and deashing. The above process can efficiently remove residual metals without using a deashing agent and afford a highly pure high-grade crystalline styrenic polymer excellent in color tone.

8 Claims, No Drawings

PROCESS FOR PURIFICATION OF STYRENIC POLYMER

This application is a continuation of application Ser. No. 08/290,786, filed on Sep. 6, 1994, now abandoned, which was filed as International Application No. PCT/JP94/00023, on Jan. 11, 1994.

TECHNICAL FIELD

The present invention relates to a process for the purification of a styrenic polymer. More particularly, it pertains to a process for efficiently purifying a crystalline styrenic polymer having a high degree of syndiotactic configuration in its stereochemical structure of polymer chain to a high level of purity.

BACKGROUND ART

Heretofore, styrenic polymers produced by the radical polymerization or the like have had an atactic configuration in stereostructure, have been molded to a variety of shapes by various molding methods such as injection molding, extrusion molding, blow molding, vacuum molding and cast molding and have been used for electrical appliances, office machines, household goods, packaging containers, toys, furnitures, synthetic papers and other industrial materials.

Because of their atactic configuration in stereochemical structure, however, such styrenic polymers have suffered the disadvantage of inferior heat and chemical resistances.

The group of the present inventors has previously succeeded in developing styrenic polymers each having a high degree of syndiotacticity and further, has proved that crystalline styrenic polymers having syndiotactic configuration are obtained by the use of a catalyst comprising a titanium compound and a contact product (alkylaluminoxane) of an organoaluminum compound with a condensing agent (refer to Japanese Patent Application Laid-Open No. 187708/1987).

The above-mentioned crystalline styrenic polymers are produced by means of slurry polymerization, bulk polymerization or the like and preferably in a high concentration of styrene from the viewpoint of the catalyst activity and polymer productivity. However, the use of a catalyst containing a metal (Al, Ti, Fe, etc.) in the production of the styrenic polymers has caused the problems, depending on the catalytic activity, that the metallic components remain in the polymers thus obtained, the molecular weight thereof is lowered or the color tone thereof is worsened. Therefore, it has been desired to minimize the residual catalyst components in the obtained polymer by means of deashing (removal of residual catalyst).

As a process for the deashing treatment, mention is made of a process in which a deashing agent is added to the polymer to treat the same, a process in which a swelling agent is employed to make the polymer swell, a process in which the treatment temperature is raised in any of the aforementioned processes in order to improve the deashing efficiency and the like processes.

However, these processes involve the problems that the deashing efficiency is low, cleaning is required, a stable operation is difficult and so forth.

Specifically, the process in which a deashing agent is added involves such problems as to necessitate a step of removing the deashing agent and the use of a large amount of a solvent, thereby complicating the process itself and increasing the installation cost.

On the other hand, the process in which a swelling agent is employed is capable of deactivation and deashing under a relatively mild treatment condition, but still involves such problems that the produced polymer is dissolved or agglomerated depending on the composition and conversion efficiency of the resultant polymer, liquid composition of the treating liquid and the treatment temperature, thus making stable operation difficult and moreover, the swelling of the polymer brings about a large amount of a waste liquid containing residual catalyst, thus making it impossible to decrease the quantity of the residual metallic component to a prescribed level or lower.

DISCLOSURE OF THE INVENTION

Under such circumstances, intensive research and investigation were made by the present inventors in order to overcome the above-mentioned problems involved in the prior art and to develop a process wherein a styrenic polymer with a high conversion efficiency can efficiently be purified to a high purity.

As a result, it has been found that the aforestated problems can be solved, that is, the stability in the treatment (dissolution or agglomeration of the polymer) can be improved and at the same time, the deactivation and deashing can be effected efficiently by treating the crystalline styrenic polymer that is the object of purification by the use of a poor solvent alone or the combined use of a poor solvent and a swelling agent each as a treating agent. The present invention has been accomplished on the basis of the abovementioned finding and information.

That is to say, the present invention provides as its first aspect, a process for purifying a styrenic polymer which comprises adding a poor solvent to a crystalline styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound and treating said polymer in a state of slurry for the catalyst deactivation and polymer deashing.

The present invention further provides as its second aspect, a process for purifying a styrenic polymer which comprises adding a poor solvent or the mixed solvent of a poor solvent and a swelling agent to a crystalline styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound, and treating said polymer in a state of powder.

THE MOST PREFERRED EMBODIMENT TO CARRY OUT THE INVENTION

The component (A) of the catalyst to be used in the present invention is, as mentioned above, an aluminoxane or a coordination complex compound comprising a cation and an anion in which a plurality of radicals are bonded to a metal. Here, the aluminoxane is a compound obtained by bringing one of various organoaluminum compounds into contact with a condensing agent. As the organoaluminum compound used as a starting material, an organoaluminum compound represented by the general formula (III)

$$AlR_3^{17} \qquad (III)$$

wherein $R^{17}$ is an alkyl group having 1 to 8 carbon atoms, more specifically, trimethylaluminum, triethylaluminum and triisobutylaluminum can be mentioned, and trimethylaluminum is most desirable.

On the other hand, a typical example of the condensing agent for said organoaluminum compound is water. In addition, any compounds capable of undergoing a condensation reaction with organoaluminum compounds including alkylaluminum can be used.

Examples of such aluminoxane of Component (A) include chain alkylaluminoxane represented by the general formula (IV)

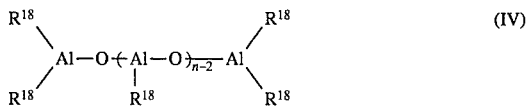

wherein $R^{18}$ independently of one another is a hydrocarbon group such as an alkyl group having 1 to 20, preferably 1 to 12 carbon atoms, an alkenyl group having 2 to 12 carbon atoms, an aryl group having 6 to 12 carbon atoms or an arylalkyl group having 7 to 12 carbon atoms or a halogen atom, and may be the same as or different from each other; and n stands for a degree of polymerization, which is usually an integer of 2 to 50, preferably 7 to 40.
and cycloalkylaluminoxane having the repeating unit represented by the general formula (V)

wherein $R^{18}$ and n are each as previously defined. Of these alkylaluminoxanes, that wherein $R^{18}$ is a methyl group, i.e. methylaluminoxane is particularly desirable.

As the component (A) which constitutes the primary ingredient of the catalyst in the process according to the present invention, a coordination complex compound comprising a cation and an anion in which a plurality of radicals are bonded to a metal can be used in place of the aforestated aluminoxane. A variety of such coordination complex compounds are available, and those represented by the following general formula (VI) or (VII) are preferably employed:

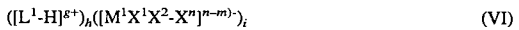

or

wherein $L^2$ is $M^3$, $T^1T^2M^4$ or $T^3{}_3C$ as hereinafter described; $L_1$ is a Lewis base; $M^1$ and $M^2$ are each a metal selected from Groups 5 to 15 of the Periodic Table; $M^3$ is a metal selected from Groups 8 to 12 of the Periodic Table; $M^4$ is a metal selected from Groups 8 to 10 of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group having 7 to 20 carbon atoms, arylalkyl group having 7 to 20 carbon atoms, substituted alkyl group, organometalloid group or halogen atom; $T^1$ and $T^2$ are each a cyclopentadienyl group, substituted cyclopentadienyl group, indenyl group or fluorenyl group; $T^3$ is an alkyl group; m is the valency of each of $M^1$ and $M^2$ indicating an integer of 1 to 7; n is an integer of 2 to 8; g is the ion valency of each of $[L^1\text{-H}]$ and $[L^2]$, indicating an integer of 1 to 7; h is an integer of 1 or more; and $i=h\times g/(n-m)$.

Specific examples of $M^1$ and $M^2$ include B, Al, Si, P, As, Sb, etc.; those of $M^3$ include Ag, Cu, etc.; and those of $M^4$ include Fe, Co, Ni, etc. Specific examples of $X^1$ to $X^n$ include dialkylamino group such as dimethylamino and diethylamino; alkoxyl group such as methoxy, ethoxy and n-butoxy; aryloxy group such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid group such as pentamethylantimony group, trimethylsilyl group, trimethylgermyl group, diphenylarsine group, dicyclohexylantimony group and diphenylboron group. Specific examples of substituted cyclopentadienyl of $R^5$ and $R^6$ include methylcyclopentadienyl, butylcyclopentadienyl and pentamethylcyclopentadienyl.

As the transition metal compound of component (B) of the catalyst used in the present invention, mention may be made of the compound of the metals in Groups 3 to 6 of the Periodic Table and lanthanum series, of which are preferable compounds of the metals in Group 4 (titanium, zirconium hafnium, vanadium, etc.). Various titanium compound are available and a preferred example is at least one compound selected from the group consisting of titanium compounds and titanium chelate compounds represented by the general formula (VIII) or (IX)

or

$R^2$, $R^3$, $R^4$ and $R^5$ in the formulae (VI) and (VII) each represent a hydrogen atom, an alkyl group having 1 to 20 carbon atoms (specifically, methyl group, ethyl group, propyl group, butyl group, amyl group, isoamyl group, isobutyl group octyl group and 2-ethylhexyl group), an alkoxy group having 1 to 20 carbon atoms (specifically, methoxy group, ethoxy group, propoxy group, butoxy group, amyloxy group, hexyloxy group, and 2-ethylhexyloxy group), an aryl group, an alkylaryl group and an arylalkyl group each having 6 to 20 carbon atoms (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^2$, $R^3$, $R^4$ and $R^5$ may be the same as or different from each other. Furthermore, a, b and c each are an integer of 0 to 4, and d and e each are an integer of 0 to 3.

More preferred titanium compounds include a titanium compound represented by the formula (X)

wherein R' represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

The substituted cyclopentadienyl group represented by R' in the above formula is, for example, a cyclopentadienyl group substituted by at least one of an alkyl group having 1 to 6 carbon atoms, more specifically, methylcyclopentadienyl group, 1,2-dimethylcyclopentadienyl group and pentamethylcyclopentadienyl group.

Furthermore, a condensed titanium compound represented by the following formula (XI) can be used as the titanium compound.

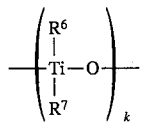 (XI)

wherein $R^6$ and $R^7$ each represent a halogen atom, an alkoxy group having 1 to 20 carbon atoms or an acyloxy group having 1 to 20 carbon atoms; and k is an integer of 2 to 20.

Furthermore, the above titanium compounds can be used in the form of a complex formed with an ester or an ether.

In addition, the zirconium compound used as the transition metal compound includes tetrabenzylzirconium, zirconium tetraethoxide, zirconium tetrabutoxide, bisindenylzirconium dichloride, triisopropoxyzirconium monochloride, zirconium benzyl dichloride and tributoxyzirconium monochloride, hafnium compound includes tetrabenzyl hafnium, tetraethoxide hafnium and tetrabutoxide hafnium, and vanadium compound includes vanadyl bisacetylacetonato, vanadyl triacetylacetonato, vanadyl triethoxide and vanadyl tripropoxide. Of these transition metal compounds, the titnaium compounds are particularly desirable.

As the transition metal compound which constitutes the component (B) of the catalyst, there may be used a transition metal compound with two ligands having conjugated π electrons, for example, at least one compound selected from the group consisting of the transition metal compound represented by the general formula (XII)

$$M^5R^8R^9R^{10}R^{11} \quad (XII)$$

wherein $M^5$ is titanium, zirconium or hafnium; $R^8$ and $R^9$ are each a cyclopentadienyl group, substituted cyclopentadienyl group, indenyl group or fluorenyl group; and $R^{10}$ and $R^{11}$ are each a hydrogen atom, halogen, hydrocarbon radical having 1 to 20 carbon atoms, alkoxy group having 1 to 20 carbon atoms, amino group or thioalkoxy group having 1 to 20 carbon atoms, but $R^8$ and $R^9$ may be each cross-linked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In the process of the present invention, if desired, in addition to the above components (A) and (B), another catalytic components such as organoaluminum can be added.

The organoaluminum includes an organoaluminum compound represented by the formula (XIII)

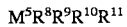 (XIII)

wherein $R^{12}$ and $R^{13}$ each independently represent an alkyl group having 1 to 8 carbon atoms, preferably 1 to 4 carbon atoms; X' represents a halogen; j, x, y and z are $0<j\leq3$, $0\leq x<3$, $0\leq y<3$ and $0\leq z<3$, respectively, and $j+x+y+z=3$.

In order to produce a styrenic polymer, styrenic monomer/s are polymerized or copolymerized in the presence of a catalyst comprising the above-mentioned components (A) and (B) as primary components.

The styrenic monomer to be used in the present invention indicates styrene and/or styrene derivatives.

Specific examples of the styrene derivatives include alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, methylstyrene and p-tertiary-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; alkoxystyrenes such as p-methoxystyrene, m-methoxystyrene, o-methoxystyrene, p-ethoxystyrene, m-ethoxystyrene, and o-ethoxystyrene; carboxyesterstyrenes such as p-carboxymethylstyrene, m-carboxymethylstyrene, and o-carboxymethylstyrene; alkyl etherstyrenes such as p-vinylbenzylpropylether; or mixtures of two or more kinds of them.

The polymerization (or copolymerization) method of styrenic monomer is not specifically limited, but may be selected from any of bulk polymerization, solution polymerization, slurry polymerization and the like. Of these bulk polymerization is particularly excellent in terms of productivity.

The polymerization temperature is not specifically limited, but is usually 0° to 100° C., preferably 50° to 90° C.

The styrenic polymer thus obtained has a high degree of syndiotactic configuration.

Here, the styrenic polymer Which has a high degree of the syndiotactic configuration means that its stereochemical structure is of high degree of syndiotactic configuration, i,e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of syndiotactic configuration" as mentioned in the present invention usually means polystyrene, poly(alkylstyrene), poly(halogenated styrene), poly(alkoxystyrene), poly(vinyl benzoate), the mixture thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene). Poly(halogenated styrene) includes poly(chlorostyrene), poly(bromostyrene), and poly(fluorostyrene). Poly(alkoxystyrene) includes poly(methoxystyrene), and poly(ethoxystyrene).

The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

In the case of purifying, according to the process of the present invention, the crystalline styrenic polymer having a high degree of syndiotactic configuration which has been produced in the above-mentioned manner, it is made possible to efficiently remove the catalyst components remaining in the styrenic polymer and improve the color tone thereof by treating said styrenic polymer by the use of a poor solvent alone or a mixed solvent of a poor solvent and a swelling agent each as a treating agent.

In the case of low catalyst activity, the deashing of the polymer preferably in a state of slurry is necessary because of a considerable amount of the metallic components remaining in the styrenic polymer. On the other hand in the case of high catalyst activity, the deashing of the polymer is unnecessary and only the catalyst deactivation is required, in which a powdery state is satisfactory without the need of a slurry state.

In the process according to the first aspect of the present invention, deactivation of the catalyst components and deashing can effectively be performed, for example, by sampling the crystalline styrenic polymer in a state that the activity of the catalyst in the polymer is preserved, adding a specific poor solvent, and treating the polymer in a state of slurry.

In the process according to the first aspect of the present invention, there is used as a poor solvent, a compound represented by the general formula (I)

$$R^{14}\text{-OH} \qquad (I)$$

wherein $R^{14}$ is an alkyl group having 1 to 6 carbon atoms or the general formula (II)

$$NR^{15}{}_3 \qquad (II)$$

wherein $R^{15}$ is each a hydrogen atom or an alkyl group having 1 to 6 carbon atoms, and when $R^{15}$ is an alkyl group, it may be the same as or different from each other.

Examples of the alkyl group having 1 to 6 carbon atoms include the groups of methyl, ethyl, n-propyl, isopropyl, tert-butyl, n-penthyl and n-hexyl.

The compound represented by the general formula (I) is available from a variety of compounds and exemplified by methanol, ethanol, propanol, n-butanol, isobutanol, sec-butanol, tert-butanol, n-pentanol, isopentanol, tert-pentanol and n-hexanol.

In addition, the compound represented by the general formula (II) is available from various compounds and enumerated by ammonia; methylamine, ethylamine, n-propylamine, isopropylamine, n-propylamine, n-butylamine, isobutylamine, sec-butylamine and tert-butylamine each having one alkyl group; dimethylamine, diethylamine and di-n-propylamine each having two alkyl groups; and trimethylamine and triethylamine each having three alkyl groups.

The compound represented by the general formula (I) or (II) may be employed alone or in combination with at least one other one, and is preferably selected from methanol, ethanol, diethylamine and the like.

The amount of the poor solvent to be added need only be such that a state of slurry is maintained by the addition thereof, and is usually 30 to 95%, preferably 50 to 85% by weight based on the total amount of the crystalline styrenic polymer and the poor solvent to be added. An amount thereof of less than 30% by weight unfavorably leads to a result that sufficient deashing of the catalyst components is made impossible or a long time is required for deashing. On the other hand, an excessive amount thereof brings about disadvantage from the viewpoint of the process since an deashing efficiency is not so enhanced, considering such amount. The treatment temperature is 20° C. or higher, preferably not lower than the glass transition temperature (Tg) of the styrenic polymer and lower than the melting temperature of the styrenic polymer. The upper limit of the temperature is determined by the amount of the residual monomer in the polymer, the kind of the poor solvent, the amount of the poor solvent to be added or the composition of the polymer (for example, copolymerized amount).

For example, when methanol is used at a slurry concentration of 20% by weight for the styrenic polymer obtained at a conversion of 80%, a treatment temperature of 200° C. results in failure to maintain a slurry state owing to the melting and sticking of the polymer particles, whereas that of lower than 20° C. unfavorably leads to a long treatment time, since the added poor solvent is less apt to penetrate in the polymer.

The purifying treatment time depends on the composition of the polymer, the kind of the poor solvent to be added, the amount of the poor solvent to be added, the treatment temperature and the like and, consequently, can not unequivocally be determined, but it is 60 minutes, approximately as a basic principle.

The water content in the poor solvent to be added in the treatment step is preferably regulated to at least 15 ppm, at most 10,000 ppm, preferably 50 to 3,000 ppm. The regulation can be made by a conventional dehydration method exemplified by a method in which the solvent is subjected to bubbling by dry nitrogen and a method using an adsorbent such as a molecular sieve or a dehydrating agent. A water content of less than 15 ppm or more than 10,000 ppm in the poor solvent sometimes results in a low efficiency of removing the residual metal components derived from the catalyst, thus failing to produce a highly pure styrenic polymer.

In the process according to the second aspect of the present invention, it is necessary to add, for example, a specific poor solvent or the mixed solvent of a poor solvent and a swelling agent to crystalline styrenic polymer in power form and to treat said styrenic polymer under the condition maintained in powdery state.

In the second aspect of the present invention, there is used as a poor solvent, a compound represented by the general formula (III')

$$R^{16}\text{-OH} \qquad (III')$$

wherein $R^{16}$ is an hydrogen atom or an alkyl group having 1 to 6 carbon atoms, or the general formula (II')

$$NR^{15}{}_3 \qquad (II')$$

wherein $R^{15}$ is each a hydrogen atom or an alkyl group having 1 to 6 carbon atoms, and when $R^{15}$ is an alkyl group, it may be the same as or different from each other.

Examples of the alkyl group having 1 to 6 carbon atoms include the groups of methyl, ethyl, n-propyl, isopropyl, tert-butyl, n-pentyl and n-hexyl.

The compound represented by the general formula (III') is available from a variety of compounds and exemplified by methanol, ethanol, propanol, n-butanol, isobutanol, sec-butanol, tert-butanol, n-pentanol, isopentanol, tert-pentanol and n-hexanol.

In addition, the compound represented by the general formula (II') is available from various compounds and enumerated by ammonia; methylamine, ethylamine, n-propylamine, isopropylamine, n-propylamine, n-butylamine, isobutylamine, sec-butylamine and tert-butylamine each having one alkyl group; dimethylamine, diethylamine and di-n-propylamine each having two alkyl groups; and trimethylamine and triethylamine each having three alkyl groups.

The compound represented by the general formula (III') or (II') may be employed alone or in combination with at least one other one, and is preferably selected from methanol, ethanol, diethylamine and the like.

The swelling agent to be used herein has a solubility parameter (SP value) of desirably 7 to 10 $(cal/cm^3)^{1/2}$, more desirably 8 to 9 $(cal/cm^3)^{1/2}$. The swelling agent to be used is not specifically limited in the type, but is exemplified by an aromatic solvent such as benzene, toluene, ethylbenzene, xylene and styrene, of which are preferable ethylbenzene, xylene and toluene; and an aliphatic solvent such as cyclohexane and methyl ethyl ketone, of which is preferable cyclohexane.

In the second aspect of the present invention, the amount of a poor solvent or the mixed solvent of a poor solvent and a swelling agent to be added need only be such that a state of powder can be maintained even when the poor solvent alone or the mixed solvent of a poor solvent and a swelling agent is added to the crystalline styrenic polymer, and it is usually 0.1 to 30%, preferably 1.0 to 20%, more preferably 2.0 to 10% each by weight based on the total amount of the crystalline styrenic polymer and the poor solvent or the mixed solvent of a poor solvent and a swelling agent. An amount thereof of less than 0.1% by weight cases insufficiency in the improvement in the color tone of the crystalline styrenic polymer, whereas that of more than 30% by weight results in failure to maintain a powdery state, thereby necessitating a post-treatment such as solid-liquid separation.

In the case the mixed solvent of a poor solvent and a swelling agent is employed, the amount of the mixed solvent is as described hereinbefore, and the compounding ratio of the poor solvent to the swelling agent is 100/99 to 0, preferably 20 to 100/80 to 0. An excessive amount of the swelling agent causes an increase in the solubility of the polymer, which is unfavorable from the viewpoint of stable operation. In the purifying treatment, the poor solvent and the swelling agent may each be added separately in a treatment vessel or in the form of a mixed solvent after mixing.

The treatment temperature varies depending on the composition of the polymer (copolymerized amount), the kind or amount of the treating agent and the like and thus, can not unequivocally be determined, but it is generally not lower than the glass transition temperature (Tg) of the styrenic polymer and not higher than the temperature at which the styrenic polymer begins to melt. The treatment time depends greatly upon the composition of the polymer, the kind of the treating agent to be added, the amount of the treating agent to be added, the treatment temperature and the like and accordingly, can not unconditionally be determined, but it is basically 30 to 180 minutes, preferably 60 to 120 minutes, approximately.

According to the present invention, the purified crystalline styrenic polymer is obtained by the purifying treatment in the above-mentioned manner, followed by drying when necessary but dispensing with washing of the polymer.

According to the present invention as described above, it is made possible to efficiently purify the styrenic polymer to high purity and produce the crystalline styrenic polymer having excellent color tone by employing a poor solvent or the mixed solvent of a poor solvent and a swelling agent for the purpose of purifying treatment.

In the following, the present invention will be described in more detail with reference to examples and comparative examples.

EXAMPLE 1

By the use of a catalyst consisting of pentamethylcyclopentadienyltitanium trimethoxide (A), N,N-dimethylanilinium tetra(pentafluorophenyl)borate (B) and triisobutylaluminum (C) at a molar ratio, SM (styrene monomer) : C: B: A=350,000: 240: 4: 4, SM was polymerized at 70° C. for 4 hours into a polymer (syndiotactic polystyrene) at a conversion efficiency of 81%. A one (1) liter treatment vessel was charged with 100 g of the resultant polymer in an atmosphere of nitrogen and then with 700 ml of methanol (MeOH) freed from oxygen and having a water content prepared to 20 ppm. The mixture in the vessel was heated to 150° C. with stirring, and maintained thereat for 60 minutes, followed by cooling, filtering and vacuum drying. 100 parts by weight of the polymer thus obtained as the sample was incorporated with 0.2 part by weight of pentaerythrityl-tetrakis[3-(3,5-di-tert-butyl-4-hydroxyphenyl)]propionate and 0.2 part by weight of (2,6-di-tert-butyl-4-methylphenyl)pentaerythritol diphosphite each as an antioxidant and was injection molded. The results obtained are given in Table 1.

EXAMPLE 2

The procedure in Example 1 was repeated except that methanol having a water content prepared to 200 ppm was used in the purification step. The results obtained are given in Table 1.

EXAMPLE 3

The procedure in Example 1 was repeated except that methanol having a water content prepared to 2,000 ppm was used in the purification step. The results obtained are given in Table 1.

EXAMPLE 4

The procedure in Example 2 was repeated except that methanol was used in an amount of 150 ml, in which case the content of the polymer was 46% by weight.

EXAMPLE 5

By the use of catalyst consisting of triisobutylaluminum (A), methylaluminoxane (B) and pentamethylcyclopentadienyltitanium trimethoxide (C) at a molar ratio of SM (styrene monomer) : A: B: C=350,000: 800: 400: 4, SM was polymerized at 80° C. for 6 hours into a polymer (syndiotactic polystyrene) at a conversion efficiency of 79%. A one (1) liter treatment vessel was charged with 100 g of the resultant polymer in an atmosphere of nitrogen and thereafter the polymer was treated in the same manner as in Example 2 except that ethanol freed from oxygen was used. The results obtained are given in Table 1.

EXAMPLE 6

The procedure in Example 2 was repeated except that the treatment temperature was set on 170° C. The results obtained are given in Table 1.

EXAMPLE 7

In the polymerization according to Example 1, 11 mol % of para-methylstyrene (PMS) was added to SM to obtain a polymer containing 12 mol % of PMS at a conversion efficiency of 84%. Thereafter the polymer was treated in the same manner as in Example 2. The results obtained are given in Table 1.

EXAMPLE 8

The procedure in Example 2 was repeated except that 700 ml of diethylamine (DEtA) was used as a treating agent. The results obtained are given in Table 1.

COMPARATIVE EXAMPLE 1

The procedure in Example 2 was repeated except that the polymer obtained was vacuum dried as such without solvent treatment. The results obtained are given in Table 1.

COMPARATIVE EXAMPLE 2

The procedure in Example 5 was repeated except that the polymer obtained was vacuum dried as such without solvent treatment. The results are given in Table 1.

EXAMPLE 9

By the use of the catalyst same as that in Example 5 at a molar ratio of SM: A: B: C=350,000: 80: 40: 0.4, SM was polymerized at 70° C. for 15 hours into a polymer (syndiotactic polystyrene) at a conversion efficiency of 65%. A one (1) liter polymerization vessel was charged with 100 g of the resultant polymer in an atmosphere of nitrogen and thereafter the polymer was treated in the same manner as in Example 5 except that 2% by weight of methanol freed from oxygen was added and then stirred at 20° C. for 10 hours. The results obtained are given in Table 1.

EXAMPLE 10

By the use of the catalyst same as that in Example 1 at a molar ratio of SM: C: B: A=350,000: 40: 2: 2, SM was polymerized at 70° C. for 4 hours under a hydrogen pressure of 0.5 kg/cm$^2$G into a polymer (syndiotactic polystyrene) at a conversion efficiency of 78%. A one (1) liter treatment vessel was charged with 150 g of the resultant polymer in an atmosphere of nitrogen and then with 2.5 ml of methanol freed from oxygen. The mixture in the vessel was heated to 100° C. with stirring and maintained thereat for 3 hours, followed by cooling and drying. The sample thus obtained was injection molded in the same manner as in Example 1. The results obtained are given in Table 2.

EXAMPLE 11

The procedure in Example 10 was repeated except that 2 ml of water was used in place of 2.5 ml of methanol and that the mixture was heated to 130° C. instead of 100° C. and maintained for one (1) hour instead of 3 hours. The results obtained are given in Table 2.

EXAMPLE 12

The procedure in Example 10 was repeated except that 2.5 ml of ethanol was used in place of 2.5 ml of methanol and that the mixture was heated to 130° C. instead of 100° C. and maintained for one (1) hour instead of 3 hours. The results obtained are given in Table 2.

EXAMPLE 13

The procedure in Example 10 was repeated except that the mixed solvent of 25 ml of ethylbenzene (EB) and 2.5 ml of methanol was used in place of 2.5 ml of methanol and that the mixture was heated to 130° C. instead of 100° C. and maintained for one (1) hour instead of 3 hours. The results obtained are given in Table 2.

EXAMPLE 14

By the use of the catalyst same as that in Example 1 at a molar ratio of SM: C: B: A=350,000: 40: 2: 2, SM and para-methylstyrene (PMS) contained in an amount of 11 mol % in SM were polymerized at 70° C. for 4 hours under a hydrogen pressure of 0.5 kg/cm$^2$G into a polymer (syndiotactic copolymer of styrene and para-methylstyrene) at a conversion efficiency of 75%. A one (1) liter treatment vessel was charged with 150 g of the resultant polymer in an atmosphere of nitrogen and then with 2.5 ml of methanol freed from oxygen. The mixture in the vessel was heated to 100° C. with stirring and maintained thereat for 3 hours, followed by cooling and drying. The sample thus obtained was injection molded in the same manner as in Example 1. The results obtained are given in Table 2.

EXAMPLE 15

The procedure in Example 14 was repeated except that 2 ml of water was used in place of 2.5 ml of methanol. The results obtained are given in Table 2.

EXAMPLE 16

By the use of the catalyst same as that in Example 5 at a molar ratio of SM: C: B: A=350,000: 400: 200: 2, SM was polymerized at 70° C. for 4 hours under a hydrogen pressure of 0.5 kg/cm$^2$G into a polymer (syndiotactic polystyrene) at a conversion efficiency of 75%. A one (1) liter treatment vessel was charged with 150 g of the resultant polymer in an atmosphere of nitrogen and then with 2.5 ml of methanol freed from oxygen. The mixture in the vessel was heated to 100° C. with stirring and maintained thereat for 3 hours, followed by cooling and drying. The sample thus obtained was injection molded in the same manner as in Example 1. The results obtained are given in Table 2.

EXAMPLE 17

The procedure in Example 16 was repeated except that 2 ml of water was used in place of 2.5 ml of methanol. The results obtained are given in Table 2.

EXAMPLE 18

By the use of the catalyst same as that in Example 5 at a molar ratio of SM: C: B: A=350,000: 400: 200: 2, SM and para-methylstyrene (PMS) contained in an amount of 11 mol % in SM were polymerized at 70° C. for 4 hours under a hydrogen pressure of 0.5 kg/cm$^2$G into a polymer (syndiotactic copolymer of styrene and para-methylstyrene) at a conversion efficiency of 71%. A one (1) liter treatment vessel was charged with 150 g of the resultant polymer in an atmosphere of nitrogen and then with 2.5 ml of methanol freed from oxygen. The mixture in the vessel was heated to 100° C. with stirring and maintained thereat for 3 hours, followed by cooling and drying. The sample thus obtained was injection molded in the same manner as in Example 1. The results obtained are given in Table 2.

EXAMPLE 19

The procedure in Example 18 was repeated except that 2 ml of water was used in place of 2.5 ml of methanol. The results obtained are given in Table 2.

COMPARATIVE EXAMPLE 3

The procedure in Example 10 was repeated except that the polymer obtained was vacuum dried as such without solvent treatment. The results obtained are given in Table 2.

COMPARATIVE EXAMPLE 4

The procedure in Example 14 was repeated except that the polymer obtained was vacuum dried as such without solvent treatment. The results obtained are given in Table 2.

COMPARATIVE EXAMPLE 5

The procedure in Example 16 was repeated except that the polymer obtained was vacuum dried as such without solvent treatment. The results obtained are given in Table 2.

COMPARATIVE EXAMPLE 6

The procedure in Example 18 was repeated except that the polymer obtained was vacuum dried as such without solvent treatment. The results obtained are given in Table 2.

The marks *1 and *2 in the aforesated examples and comparative examples are described as follows.

*1: Degree of deashing (DE value) obtained by the followg formula DE=i-(amount of residual metal components in ppm by weight after treatment/amount of residual metal components in ppm by weight before treatment)

*2: Yellowness Index: Tested according to JIS K-7103 except that the test pieces were maintained in the air at 20° C. for 12 hours.

TABLE 1-1

| No. | Treating agent | Treatment temperature (°C.) | Treatment time (Hr) | Ratio of solvent (% by weight) |
|---|---|---|---|---|
| Example 1 | MeOH | 150 | 1 | 85 |
| Example 2 | MeOH | 150 | 1 | 85 |
| Example 3 | MeOH | 150 | 1 | 85 |
| Example 4 | MeOH | 150 | 1 | 54 |
| Example 5 | EtOH | 150 | 1 | 85 |
| Example 6 | MeOH | 170 | 1 | 85 |
| Example 7 | MeOH | 150 | 1 | 85 |
| Example 8 | DEtA | 150 | 1 | 85 |
| Comparative Example 1 | — | — | — | — |
| Comparative Example 2 | — | — | — | — |

TABLE 1-2

| No. | Amount of residual metal components Before treatment | After treatment | Degree of deashing*1 (DE value) | YI*2 |
|---|---|---|---|---|
| Example 1 | 220 | 88 | 0.60 | 17 |
| Example 2 | 220 | 33 | 0.85 | 15 |
| Example 3 | 220 | 82 | 0.63 | 16 |
| Example 4 | 220 | 62 | 0.72 | 16 |
| Example 5 | 1100 | 85 | 0.92 | 18 |
| Example 6 | 220 | 23 | 0.90 | 14 |
| Example 7 | 220 | 35 | 0.83 | 15 |
| Example 8 | 220 | 95 | 0.57 | 20 |
| Comparative Example 1 | — | 220 | — | 49 |
| Comparative Example 2 | — | 1100 | — | 57 |

TABLE 2-1

| No. | Treating agent | Treatment temperature (°C.) | Treatment time (Hr) | Ratio of solvent (% by weight) |
|---|---|---|---|---|
| Example 9 | MeOH | 20 | 10 | 2 |
| Example 10 | MeOH | 100 | 3 | 1.3 |
| Example 11 | Water | 130 | 1 | 1.3 |
| Example 12 | EtOH | 130 | 1 | 1.3 |
| Example 13 | EB/MeOH | 130 | 1 | 13.7 |
| Example 14 | MeOH | 100 | 3 | 1.3 |
| Example 15 | Water | 100 | 3 | 1.3 |
| Example 16 | MeOH | 100 | 3 | 1.3 |
| Example 17 | Water | 100 | 3 | 1.3 |
| Example 18 | MeOH | 100 | 3 | 1.3 |
| Example 19 | Water | 100 | 3 | 1.3 |
| Comparative Example 3 | — | — | — | — |
| Comparative Example 4 | — | — | — | — |
| Comparative Example 5 | — | — | — | — |
| Comparative Example 6 | — | — | — | — |

TABLE 2-2

| No. | Amount of residual metal components Before treatment | After treatment | Degree of deashing*1 (DE value) | YI*2 |
|---|---|---|---|---|
| Example 9 | 140 | 140 | 0 | 20 |
| Example 10 | 41 | 38 | 0.07 | 18 |
| Example 11 | 41 | 39 | 0.05 | 20 |
| Example 12 | 41 | 38 | 0.07 | 21 |
| Example 13 | 41 | 40 | 0.02 | 16 |
| Example 14 | 44 | 43 | 0.02 | 20 |
| Example 15 | 44 | 41 | 0.07 | 22 |
| Example 16 | 604 | 595 | 0.01 | 23 |
| Example 17 | 604 | 601 | 0.01 | 26 |
| Example 18 | 638 | 634 | 0.01 | 25 |
| Example 19 | 638 | 632 | 0.01 | 28 |
| Comparative Example 3 | — | — | 0 | 28 |
| Comparative Example 4 | — | — | 0 | 30 |
| Comparative Example 5 | — | — | 0 | 33 |
| Comparative Example 6 | — | — | 0 | 35 |

INDUSTRIAL APPLICABILITY

According to the process of the present invention, a highly pure high-grade crystalline styrenic polymer excellent in color tone can be obtained by adding a poor solvent or the mixed solvent of a poor solvent and a swelling agent to the styrenic polymer which has been produced in the polymerization reaction system in the presence of a catalyst and treating the styrenic polymer.

Accordingly, the present invention is of industrial great value as the process for efficiently producing a highly pure crystalline styrenic polymer having a high degree of syndiotactic configuration.

We claim:

1. A process for purifying a styrenic polymer which comprises adding a poor solvent to a crystalline styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound, and treating said polymer in a state of slurry for both, the catalyst deactivation and the polymer deashing in one step; wherein said poor solvent is a compound represented by the general formula (I)

$$R^{14}\text{-OH}$$

wherein $R^{14}$ is an $C_1$–$C_6$ alkyl or a compound represented by the general formula (II)

$$NR^{15}_3$$

wherein each $R^{15}$ is a hydrogen atom or a $C_1$–$C_6$ alkyl group, and when $R^{15}$ is an alkyl group, each $R^{15}$ may be the same or different and the amount of that poor solvent to be added is 30 to 95% by weight based on the total amount of the crystalline styrene polymer and the poor solvent to be added.

2. The process for purifying a styrenic polymer according to claim 1 wherein the water content in said poor solvent is at least 15 ppm and at most 10,000 ppm.

3. The process for purifying a styrenic polymer according to claim 1 wherein the amount of the poor solvent to be added is 30 to 95% by weight based on the total amount of said crystalline styrenic polymer and poor solvent to be added.

4. The process for purifying a styrenic polymer according to claim 2 wherein the amount of the poor solvent to be added is 30 to 95% by weight based on the total amount of said crystalline styrenic polymer and poor solvent to be added.

5. A process for purifying a styrenic polymer which comprises adding a poor solvent to a crystalline styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound and treating said polymer in a form of a dispersion of solid particles, and, both, deactivating said catalyst and deashing said polymer in one step; wherein said poor solvent is a compound represented by the general formula (III')

$$R^{16}\text{-OH}$$

wherein $R^{16}$ is a hydrogen atom or an $C_1$–$C_6$ alkyl group or a compound represented by the general formula (II') wherein each $R^{15}$ is a hydrogen atom or a $C_1$–$C_6$ alkyl group, and when $R^{15}$ is an alkyl group, each $R^{15}$ may be the same or different and the amount of said poor solvent to be added is 0.1 to 30% by weight based on the total amount of said crystallized styrenic polymer and said poor solvent to be added.

6. A process for purifying a styrenic polymer which comprises adding a mixed solvent of a poor solvent and a swelling agent to a crystalline styrenic polymer having a high degree of syndiotactic configuration which is produced by the use of a catalyst comprising (A) an aluminoxane or a coordination complex compound comprising a cation and an anion in which a plurality of radicals are bonded to a metal and (B) a transition metal compound, and treating said polymer in a form of a dispersion of solid particles, and, both, deactivating said catalyst and deashing said polymer in one step; wherein said poor solvent is a compound represented by the general formal (III')

$$R^{16}\text{-OH}$$

wherein $R^{16}$ is a hydrogen atom or an $C_1$–$C_6$ alkyl group or a compound represented by the general formula (II')

$$NR^{15}_3$$

wherein each $R^{15}$ is a hydrogen atom or a $C_1$–$C_6$ alkyl group, and when $R^{15}$ is an alkyl group, each $R^{15}$ may be the same or different and the amount of said mixed solvent of the poor solvent and the swelling agent to be added is 0.1 to 30% by weight based on the total amount of said crystalline styrenic polymer and said mixed solvent of the poor solvent and the swelling agent.

7. The process for purifying a styrenic polymer according to claim 5, wherein the amount of said poor solvent to be added is 0.1 to 30% by weight based on the total amount of said crystalline styrenic polymer and said poor solvent to be added.

8. The process for purifying a styrenic polymer according to claim 6 wherein the amount of the mixed solvent of a poor solvent and a swelling agent to be added is 0.1 to 30% by weight based on the total amount of said crystalline styrenic polymer and the mixed solvent of a poor solvent and a swelling agent to be added.

* * * * *